(12) United States Patent
Egli et al.

(10) Patent No.: US 12,485,712 B2
(45) Date of Patent: Dec. 2, 2025

(54) AUTOMATED TIRE CHAIN TENSIONER

(71) Applicants: Ken Egli, Kennewick, WA (US); Jason Gilbert, Kennewick, WA (US); Christian Egli, Provo, UT (US)

(72) Inventors: Ken Egli, Kennewick, WA (US); Jason Gilbert, Kennewick, WA (US); Christian Egli, Provo, UT (US)

(73) Assignee: MM3 LLC, St. George, UT (US)

( * ) Notice: Subject to any disclaimer, the term of this patent is extended or adjusted under 35 U.S.C. 154(b) by 329 days.

(21) Appl. No.: 18/186,759

(22) Filed: Mar. 20, 2023

(65) Prior Publication Data

US 2023/0294462 A1 Sep. 21, 2023

Related U.S. Application Data

(60) Provisional application No. 63/269,592, filed on Mar. 18, 2022.

(51) Int. Cl.
*B60C 27/00* (2006.01)

(52) U.S. Cl.
CPC .................. *B60C 27/003* (2013.01)

(58) Field of Classification Search
CPC . B60C 27/10; B60C 27/0261; B60C 27/0238; B60C 27/023; B60C 27/0207; B60C 27/03; B60C 27/003; B60C 27/00
See application file for complete search history.

(56) References Cited

U.S. PATENT DOCUMENTS 2,729,261 A * 1/1956 Rucker .................. B60C 27/10
152/218
4,066,112 A * 1/1978 Goldstein ............... B60C 27/10
152/213 A

* cited by examiner

*Primary Examiner* — Cedrick S Williams
(74) *Attorney, Agent, or Firm* — Kyle B. Straughan; Holland & Knight LLP

(57) ABSTRACT

This invention relates generally to a system, device, and method for automated management of tension in tire chains and related traction improvement systems.

19 Claims, 6 Drawing Sheets

AUTOMATED TIRE CHAIN TENSIONER

PRIORITY CLAIM

This application claims priority to and/or the benefit of U.S. provisional patent application Ser. No. 63/269,592 filed Mar. 18, 2022. The foregoing application is incorporated by reference in its entirety as if fully set forth herein.

FIELD OF THE INVENTION

This invention relates generally to systems, devices, and methods for the tensioning of tire chains. As noted herein, the invention may also be applied for the management of tension of other chain or similar wheel-based traction systems or other systems which rely upon an external wrap-around or similar shell. The invention herein is not necessarily limited to such applications and can further be employed on other machines such as, but not limited to, caterpillar tread or walking devices that utilize wrap-around or similar traction enhancement devices.

BACKGROUND OF THE INVENTION

Tire chains provide vital additional traction to vehicles traveling in hazardous conditions such as snow, ice, or extreme rain by supplementing the inherent friction constant of a vehicle's wheels (or other method of locomotion). However, a consistent issue with tire chains and similar devices is that their traditional application involves wrapping the chain around the outer surface of the tire loosely such that the chain is not directly affixed to the surface and is free to move around it, resulting in circumstances in which the tire chain provides less than optimal additional friction, or in some cases, can come loose from the tire and become a hazard for other vehicles or actually causes a reduction in friction between the tire and the road due to slippage. The present invention, comprised of systems, devices, and method, aims to resolve this and other issues with tire chains by applying a constant, equal tension to the edges of the outward facing surface of the tire chain in order to keep the tire chains relatively taut against the outer surface of the tire itself, thereby ensuring appropriate levels of contact between the tire, chain, and ground and resulting in improved friction and grip.

BRIEF SUMMARY

Specific details of certain embodiments of the invention are set forth in the following description and in the figures to provide a thorough understanding of such embodiments. The present invention may have additional embodiments, may be practiced without one or more of the details described for any particular described embodiment, or may have any detail described for one particular embodiment practiced with any other detail described for another embodiment.

The invention herein comprises a system, device, and method for the automatic tensioning of chains for vehicles or other transportation mechanisms reliant on wheels or other traction or friction-based mobility.

The invention herein is not solely reliant on being used for traditional chains and could be easily implemented for other devices designed to fit around an existing mobility means to improve traction, whether presently existing or hereafter devised. The device ensures that, around the circumference of the wheel, the tension placed on the chain or similar mechanism is approximately equal to enable the chain or similar mechanism to provide an optimal or otherwise preferred amount of traction for the circumstances.

In some embodiments, the invention comprises a tire chain tensioning device that is removably coupled to a mobility component of a vehicle equipped with tire chains or a similar external traction enhancement mechanism and configured to automatically apply a force towards itself upon an outer edge of a traction enhancement mechanism, such as, but not limited to, a tire chain apparatus, using one or more tensioning members of substantially similar length affixed to a central body that is positioned on a central point on a mobility component of a vehicle such as a wheel or similar apparatus wherein the tensioning members attach to the traction enhancement mechanism through a removably couplable mechanism. The invention may have a mechanism for tightening the one or more tensioning members to the traction enhancement mechanism, drawing them towards the body of the invention to increase tension on the traction enhancement mechanism.

In some embodiments, the invention may be removably coupled to the mobility component by a bolt, screw, latch, clasp, flange, or similar mechanism, while in other embodiments the invention may be removably coupled to the mobility component by attaching to the external traction enhancement mechanism. In some embodiments, the invention may removably couple to the mobility component by attaching to a traction enhancement mechanism that is located on the mobility component, such as, but not limited to, a tire chain wherein the mobility component is a vehicular tire and the traction enhancement mechanism is a tire chain. In such embodiments, the invention may attach through a hook, clasp, carabiner, flange, lock, or similar means of removably couplable attachment.

In some embodiments, the invention may be permanently affixed to the mobility component and/or the traction enhancement mechanism depending on the needs of the user and design of the vehicle or mode of transportation that it is affixed to.

In some embodiments, the invention's tensioning members may be comprised of a member with a mechanism to removably affix the member to a traction enhancement mechanism such as, but not limited to, a hook, clasp, carabiner, latch, or similar mechanism or hybrid thereof. Some variations of the tensioning members may be permanently affixed to the traction enhancement mechanism or the invention may be incorporated into the traction enhancement mechanism. In other embodiments, the invention may be permanently affixed to the mobility component of a vehicle or other mode of transportation. The number of tensioning members can be varied depending on the needs of the embodiment, based on factors such as, but not limited to, the design of the traction enhancement mechanism, the importance of modulating the tension on the traction enhancement mechanism, cost, or any other applicable factor. Some embodiments may incorporate two, three, or any number of tensioning members as appropriate. In some embodiments, the invention can activate or deactivate certain tensioning members, such that, even though, for example, an embodiment of the invention may possess four members, it can deactivate one or more, so it could use three if necessary. In other embodiments, tensioning members can also be added to a given embodiment should the need arise. The tensioning members can, in some examples of the invention, be removable from the invention such that the number of tensioning members is modular.

In some embodiments, the tensioning members are comprised of a member or may be further comprised of a component configured to assist with equalizing the tension the member applies to the traction enhancement mechanism such as, but not limited to, a spring or similar mechanism to modulate and equalize the tension exerted by the one or more members, such that if all the members are pulling towards the body of the invention, the springs ensure that the force exerted on the tension enhancement mechanism is uniform across each of the tensioning members and the tension enhancement mechanism is thus uniformly tensioned across the entire mobility component the invention is affixed to. Depending on the needs of the embodiment, the tensioning member tension equalization component may be located at either end of the tensioning member, or somewhere along its length. In other embodiments, there may be multiple forms of tension equalization mechanism. The tensioning members may each be housed in separate spools attached to the main body of the invention or may be housed in a single housing with multiple spools or may be housed in a single housing with a shared spool depending on the configuration and needs of the user. In some embodiments, a shaft may run from the ratchet mechanism (or such other mechanism) through the spool(s) of the tensioning members, which shaft is then turned by the crank or similar mechanism in order to apply tension to the tensioning members. In some embodiments, when not being pulled or held taut by the ratchet or alternative mechanism, the tensioning members may be loose so that they can be pulled by a human user and attached where needed. However, in other embodiments, the tensioning members may still be configured to be pulled by a user, but may have a slight negative force exerted by the spool or similar mechanism such that the tensioning members are pulled into the housing of the invention with only the ends, such as the spring mechanism and/or attachment means, emerging out. Such force may keep the tensioning members secure in the housing when not in use to make the invention easier to transport or store.

The invention may, in some embodiments, have tension members that split into two or more members at some point along their length, and each of the member ends may have some, all, or none of the features described herein depending on the needs of the particular embodiment.

In some embodiments, the invention is comprised of a ratcheting or other mechanism configured to maintain the relative position and tension of the tension members and to, in some cases, ensure that they are tightened uniformly when applied to the traction enhancement mechanism. For example, in some embodiments, a user may affix the one or more tension members to a tire chain assembly wrapped around a vehicle tire, and the invention's ratcheting mechanism may be comprised of a crank that the user turns in order to draw the tensioning members towards the main body of the invention, in turn pulling the tire chains towards the body as well and tightening the tire chains. In some embodiments the device may incorporate a quick-release or similar mechanism designed to facilitate the release of the tension members so that they can be removed, or in other embodiments, the device may need to be cranked in reverse, or use another mechanism to release the tension on the tension members. Some embodiments of the invention may instead utilize an automated system, such as an electronic or computerized system for measuring and modulating the tension in the tension members, or a mechanism not yet developed. The invention may also use an alternative to a ratcheting mechanism, or no ratchets at all and rely on a locking mechanism to hold the tension members in place once they have reached a desired tension. Such locking mechanism might incorporate, but is not limited to, a pressure plate or feet designed to apply pressure to the tension member.

The invention may utilize a hand crank, or such other mechanism as needed, that can be operated by a user to draw the tension members towards the invention and thus apply tension to the tire chains or similar mechanism. The tension members do not need to be drawn directly towards the center of the invention, and in some embodiments may be directed to emerge from the invention at an angle to accommodate the needs of the user, traction enhancement mechanism, or mobility component they are attached to. In some embodiments, the hand crank may instead be a wheel, it may be a crank with multiple flanges, a pull-cord, or any other suitable mechanism for tightening the mechanism, whether it utilizes a ratchet system or an alternative. For some examples of the invention the crank or similar component may be affixed to the invention, while in others it may be removably coupled to the housing of the invention.

In some embodiments, the invention may be modular, such that individual tensioning members may be attached to spools that are removably coupled to the central body of the invention; thus, allowing the invention to utilize a modular number of tension members. In other embodiments, more than one of the inventions might be used on a mobility component. For example, a truck tire may have one of the inventions placed on each side of its tire, with the axle side version of the invention modified to avoid interacting with the axle, to assist with equalizing tension on the tension enhancement mechanism, such as tire chains.

BRIEF DESCRIPTION OF THE DRAWINGS

Embodiments of the present invention are described in detail below with reference to the following drawings.

DETAILED DESCRIPTION

The present invention comprises devices, systems and methods for the automated management of tire chain tension so as to optimize tension placed on a tire chain in order to in turn optimize the tire chain's effectiveness.

Figure 1:
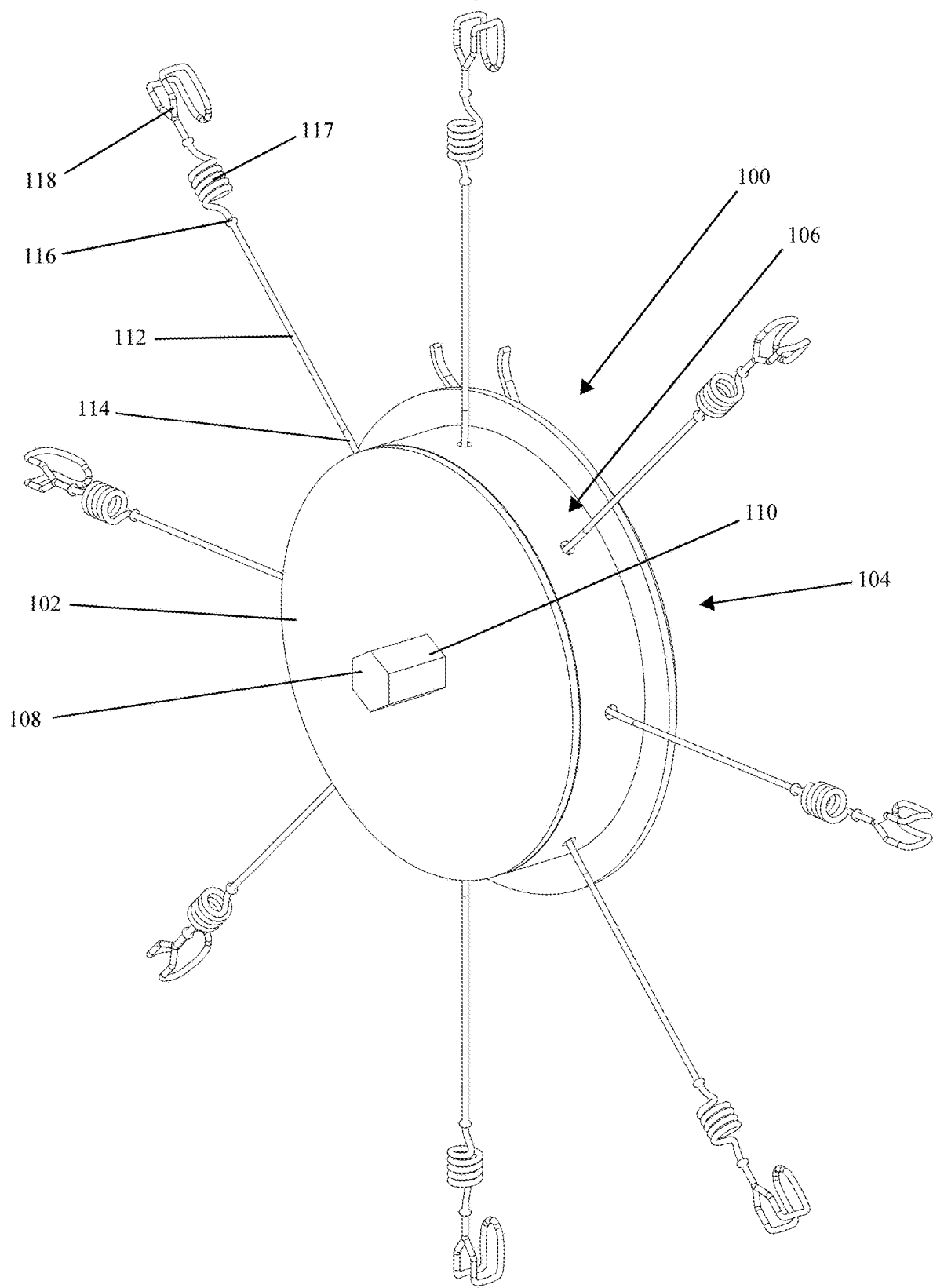
FIG. 1 depicts a perspective view of an automated tire tensioning device, in accordance with an embodiment of the invention.

FIG. 1 depicts a perspective view of an automated tire tensioning device in accordance with an embodiment of the invention. In some embodiments, the device for the management of tire chain tension 100 may be comprised of a housing 102; a tension mechanism 104 contained in the housing 102 that is comprised of: a tension applicator 106, said tension applicator 106 having a plurality of settings wherein the plurality of settings are comprised of at least one engaged setting and a disengaged setting and each of the at least one engaged settings is configured to apply a different amount of tension; a tension shifter 108 configured to change the setting of the tension applicator 106 wherein the tension shifter 108 is at least partially contained in the housing 102 except for an external interaction flange 110 wherein the interaction flange 110 alters the setting of the tension applicator 106 when interacted with; one or more tension members 112 wherein the one or more tension members 112 are configured to apply a variable amount of tension to a tire chain based on the setting of the tension shifter 108, the one or more tension members 112 further being comprised of a first end 114 and a second end 116 and further comprised of, wherein the first end 114 is coupled to the tension applicator 106 and the second end 116 is comprised of a fastener 118 removably couplable to the tire chains.

The present invention may have embodiments wherein the device 100 is comprised of a central spool comprised of a one-way ratcheting mechanism comprised of a ratchet gear configured to spin in a first direction and a second direction and a pawl configured to permit the ratchet gear to rotate in the first direction and to prevent the ratchet gear from rotating in the second direction wherein the ratchet gear is coupled to a central spool where the central spool is further coupled to a plurality of tension members 112 that extend out radially from the central spool wherein each tension member 112 is comprised of a length of material, a first end 114, and a second end 116, wherein the second end 116 is comprised of a spring 117 followed by a fastener 118; and a tension release coupled to the ratcheting mechanism such that when actuated the tension release will release the ratcheting gear and allow it to spin in a second direction.

In some embodiments, the device operates by attaching the tension members 112 to the outer edge of a tire chain once it has been applied to a vehicle; the user then operates the tension shifter 108, which may be a knob, flange, bolt, or other mechanism depending on the needs of the embodiment. Some embodiments may feature an electronically operated tension shifter 108 wherein a button, dial, or switch is used to operate the tension shifter 108. When the user operates the tension shifter 108, the tension shifter 108 increases the tension on the tension members 112, drawing the edges of the tire chain inward towards it to apply tension to the tire chains. When the tension shifter 108 is rotated, one or more spools attached to the tensioning members may be wound, causing the tension members 112 to pull inward towards the tension applicator 106, and in some embodiments a ratchet mechanism may be used to ensure that once the tension shifter 108 is rotated the spools cannot unwind.

The configuration of the spool component may vary from embodiment to embodiment, with some embodiments featuring a single spool situated around a rotational center column, while in other embodiments multiple spools may be mechanically coupled to a central gear around a rotational column, or a combination thereof. The length of material of the tension member 112 extending out of the spool may be large or small depending on the needs of the embodiment. In some embodiments, there might be a long length of material while in others there may be a short one.

Some embodiments of the tension members 112 may be comprised of a chain, cable, spring, rope, thread, coil, rod, or similar length of material. Some embodiments of the tension members 112 may feature a mix of multiple components combined to form the tension member 112, such as, but not limited to, a rod that may have a spring 117 on either end. In some embodiments, the tension member 112 is configured with a spring 117 or other material at some end wherein the spring 117 is configured to apply tension but also to respond to tension depending on the strength of the forces applied to it from either direction. In such embodiments and other similar embodiments, the tension member 112 can modulate tension on the tire chains and ensure that across multiple tension members 112 the tension is substantially the same to avoid a situation in which one of the tension members 112 pulls too much of the tire chain towards it. In that example, the tension member that is applying too much pressure will resist doing so with its spring 117 while the force on other tension members 112 will increase, causing them to resist the force of the over-tightened tension member.

The tension members 112 may connect to the tire chains through a variety of fastener 118 mechanisms including, but not limited to, by a hook, a clamp, flange, loop, ring, latch carabiner, or similar latching mechanism. The tension members 112 may also have one or more springs 117 located along their length in order to assist in the distribution and automated calibration of tension. In some embodiments, these springs 117 may be traditional coils, but in others the same effect may be achieved through cords or wires with various levels of ductility and/or flexibility as part of their construction, such as, for example, a bungie cord. In addition, some examples of the invention may utilize multiple springs 117 or similar features, with the spring 117 (or in some examples the fastener 118 or a separate component) functioning as a stop to ensure that the tension member 112 cannot be pulled into the body of the device by the tension applicator 106 if a fastener 118 were to fail or in other circumstances where the tension member 112 would have unrestricted movement. In some embodiments, the fastening mechanism for the tension member 112 may be configured to quickly release upon operation of the tension shifter 108 in a certain way, or there may be a separate mechanism that causes the tension members 112 to release the tire chains or disconnect from the tension applicator 106. Some examples of the invention may feature a tension member 112 that is permanently attached to a tire chain, either through all of its attachments or it may have one or a few of its attachments be permanent. In such cases, the device may be configured such that in a disengaged setting the spools of the tension members 112 are free to rotate so that the tire chains can be put on and then tightened with the fixed tensioner.

In some embodiments, the housing 102 may be an outer shell placed over portions of the device to protect it from damage resulting from the external environment including, but not limited to, snow, ice, dirt, gravel, or other potential contaminants or damage causing media. The housing 102 may be comprised of a variety of rubber or similar composition gaskets or similar features to permit components of the device to be protected within the housing 102 while allowing interactive or other components to be accessed externally. The housing 102 may be comprised of a variety of materials, and individual components of the housing 102 may be comprised of a variety of differing materials depending on the needs of the embodiment, including materials such as, but not limited to, plastics, metals, and/or composites. For example, some housings 102 may be comprised of plastics, while others may be made of metals such as, but not limited to, aluminum or steel. Some examples of the housing 102 may be comprised of metallic and plastic components.

Some examples of the invention may feature a tension applicator 106 and tension shifter 108 device configured to allow various settings of tension to be applied through the one or more tension members 112, or in other embodiments may allow the tension shifter 108 device to independently apply tension to specific tension members 112 if desired by the embodiment, such as in situations where the tension members 112 are otherwise unable to ensure automated distribution of tension, such as in situations where the tire chains are unevenly manufactured or damaged. In some embodiments the tension applicator 106 and tension shifter 108 components may be a single component within the tension mechanism 104.

The tension members 112 may, in some embodiments, have multiple attachment points to the tension shifter 108, such as two specific spools of material inside the tension shifter 108 that combine at a rod or clasp, with one or more lines exiting the other end of the rod or clasp in order to distribute the tension differently. In some embodiments a single spool of tension member 112 may split into two before the tire chain and thus have two fasteners 118 attached at its end in order to grip the tire chain and distribute the tension differently. Such configurations depend on the embodiment involved, the number of ends of each tension member 112, the number of connections to the tension shifter 108 for each tension member 112, and the number of tension members 112 determined by the needs of the applicable embodiment. The tension members 112 may further be arranged in a multitude of configurations depending on their number and the needs of the embodiment. For example, in some embodiments there may be six tension members 112 arranged radially around the tension applicator 106 such that each is separated from the other by approximately sixty radial degrees, while in other applications some may be located closer to others. Some examples may include tension members 112 arranged into three sets of two, with the two tension members 112 only twenty radial degrees separated, while there may be one hundred radial degrees of separation between each of the clusters. Alternatively, an embodiment may feature two sets of three tension members 112, with each in a set separated from the next by twenty radial degrees, with one hundred and forty degrees separating the nearest tension members 112 of the two sets. In addition, some embodiments of the invention may have tension members 112 which are configured to emerge from the tension applicator 106 at an angle or are configured to cross over each other if desirable for the embodiment.

The device may be embodied with a tension shifter 108 that is a ratchet mechanism with an operating bolt or flange extending outside of the housing 102 such that it can be interacted with by a user. Some embodiments may feature a handle or rod that is attached thereto in order to permit operation, while others may feature a removably couplable operation mechanism. Some embodiments may feature a minimal external operation mechanism, such as a bolt that emerges from the housing 102, in order to minimize potential for damage or wear on the operation mechanism.

In some embodiments, the tension of the device may be applied and maintained through a ratcheting mechanism wherein the ratchet mechanism is attached to the spool connected to the one or more tension members 112 and operating the ratchet in one direction turns the spool and draws the tension members 112 towards the device while operating in the other direction has no effect. In such embodiments the ratchet system may be comprised of a substantially saw-toothed or similar gear with a pawl or similar flange located facing one direction such that it will allow the gear to freely rotate in a first direction but stop it from rotating in the opposite direction. Other embodiments of the invention may not use a ratchet mechanism, and instead may rely on a lock system, pressure plate, or similar alternative to hold the tension members 112 in place once they have been set to a desired tension level.

In embodiments that comprise a ratchet component, the invention may have multiple ratchet gears to allow separate tensioning of different tension members 112 or may have various different ratchet gears that allow for finer tuning of the tension in the tension members 112. Some embodiments may be further configured to permit a small degree to reverse ratcheting to allow a user to remove some tension without entirely releasing the tension members 112; for embodiments that rely on other tensioning mechanisms, they too may be configured with granular adjustment systems that permit the user to fine-tune the amount of tension on all or some of the tension members 112.

Examples of the present invention may interact with a variety of possible tire chain configurations, such as, but not limited to, common box or square chains wherein a pair of parallel chains runs one direction while at regular intervals a perpendicular smaller chain connects the two. The device in such embodiments connects to the parallel chain corresponding with the outside of a vehicle wheel and pulls that parallel chain inward, thus putting tension on the internal perpendicular chains. In such configuration, the opposite parallel chain will be unable to widen sufficiently to escape the tire by wrapping around it, and thus the tension will be increased.

Figure 2:
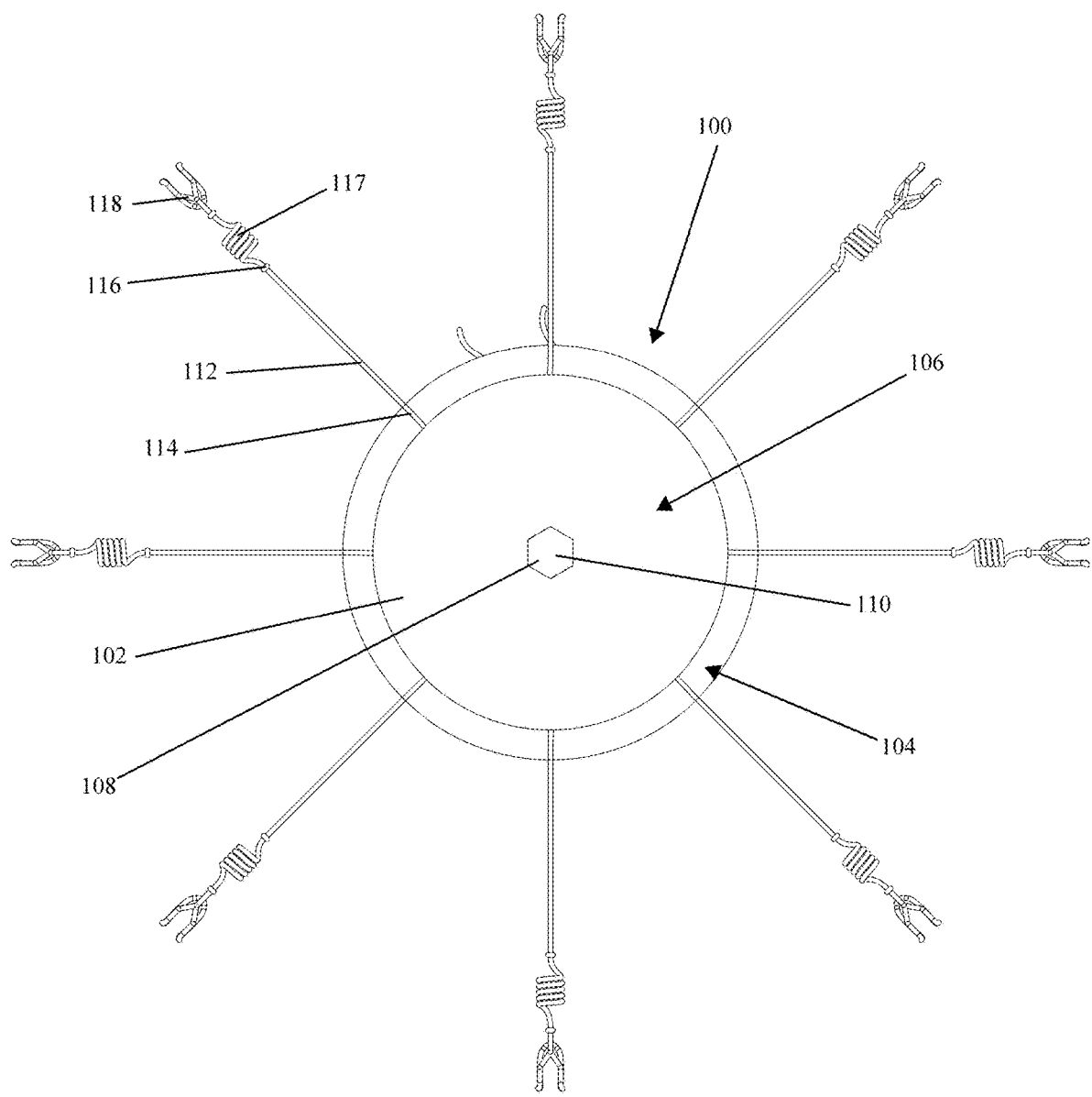
FIG. 2 depicts a front view of an automated tire tensioning device, in accordance with an embodiment of the invention.

FIG. 2 depicts a front view of an automated tire tensioning device, in accordance with an embodiment of the invention. In some embodiments, the device for the management of tire chain tension 100 may be comprised of a housing 102; a tension mechanism 104 contained in the housing 102 that is comprised of: a tension applicator 106, said tension applicator 106 having a plurality of settings wherein the plurality of settings are comprised of at least one engaged setting and a disengaged setting and each of the at least one engaged settings is configured to apply a different amount of tension; a tension shifter 108 configured to change the setting of the tension applicator 106 wherein the tension shifter 108 is at least partially contained in the housing 102 except for an external interaction flange 110 wherein the interaction flange 110 alters the setting of the tension applicator 106 when interacted with; one or more tension members 112 wherein the one or more tension members 112 are configured to apply a variable amount of tension to a tire chain based on the setting of the tension shifter 108, the one or more tension members 112 further being comprised of a first end 114 and a second end 116 and further comprised of, wherein the first end 114 is coupled to the tension applicator 106 and the second end 116 is comprised of a fastener 118 removably couplable to the tire chains.

Figure 3:
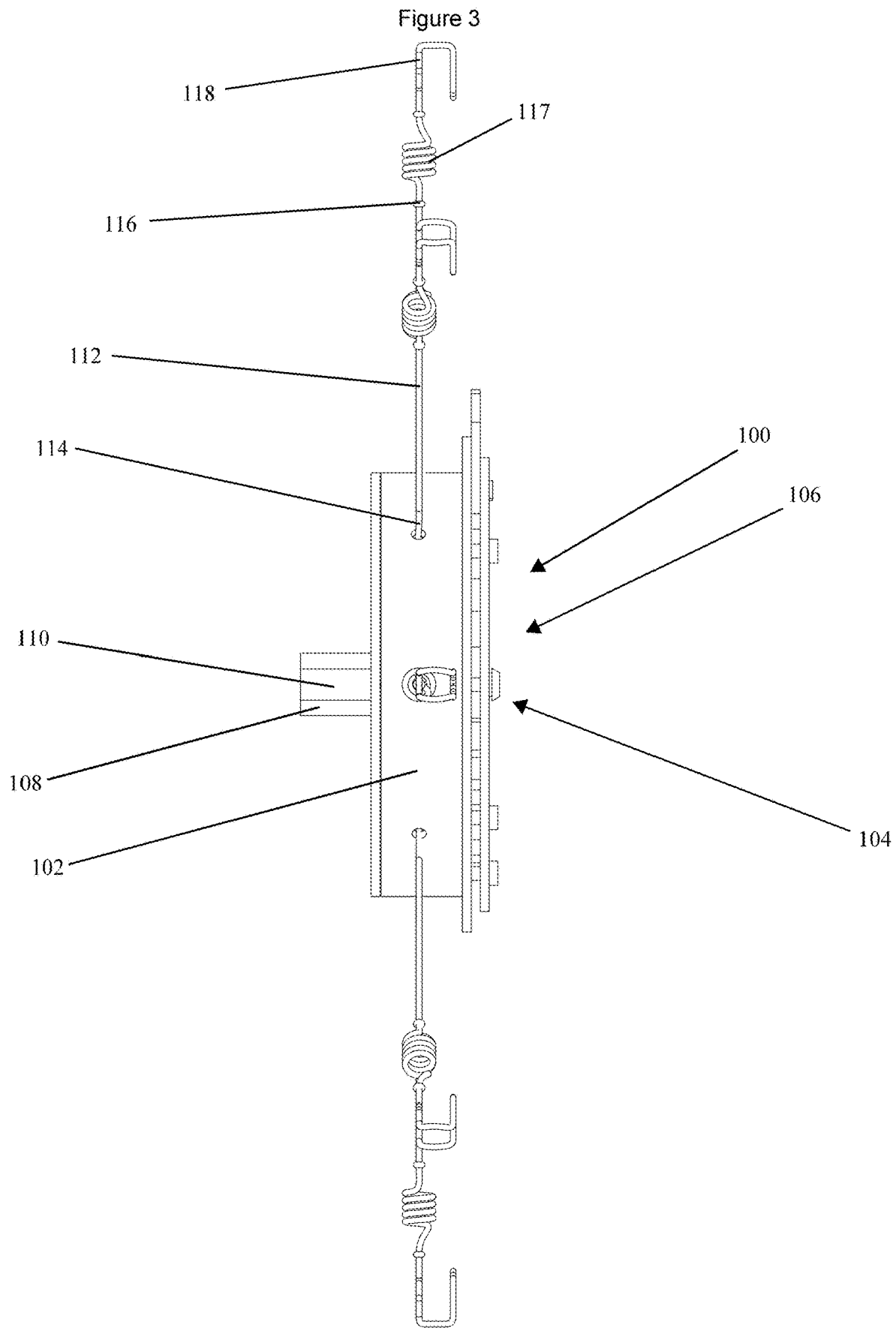
FIG. 3 depicts a side view of an automated tire tensioning device, in accordance with an embodiment of the invention.

FIG. 3 depicts a side view of an automated tire tensioning device, in accordance with an embodiment of the invention. In some embodiments, the device for the management of tire chain tension 100 may be comprised of a housing 102; a tension mechanism 104 contained in the housing 102 that is comprised of: a tension applicator 106, said tension applicator 106 having a plurality of settings wherein the plurality of settings are comprised of at least one engaged setting and a disengaged setting and each of the at least one engaged settings is configured to apply a different amount of tension; a tension shifter 108 configured to change the setting of the tension applicator 106 wherein the tension shifter 108 is at least partially contained in the housing 102 except for an external interaction flange 110 wherein the interaction flange 110 alters the setting of the tension applicator 106 when interacted with; one or more tension members 112 wherein the one or more tension members 112 are configured to apply a variable amount of tension to a tire chain based on the setting of the tension shifter 108, the one or more tension members 112 further being comprised of a first end 114 and a second end 116 and further comprised of, wherein the first end 114 is coupled to the tension applicator 106 and the second end 116 is comprised of a fastener 118 removably couplable to the tire chains.

Figure 4:
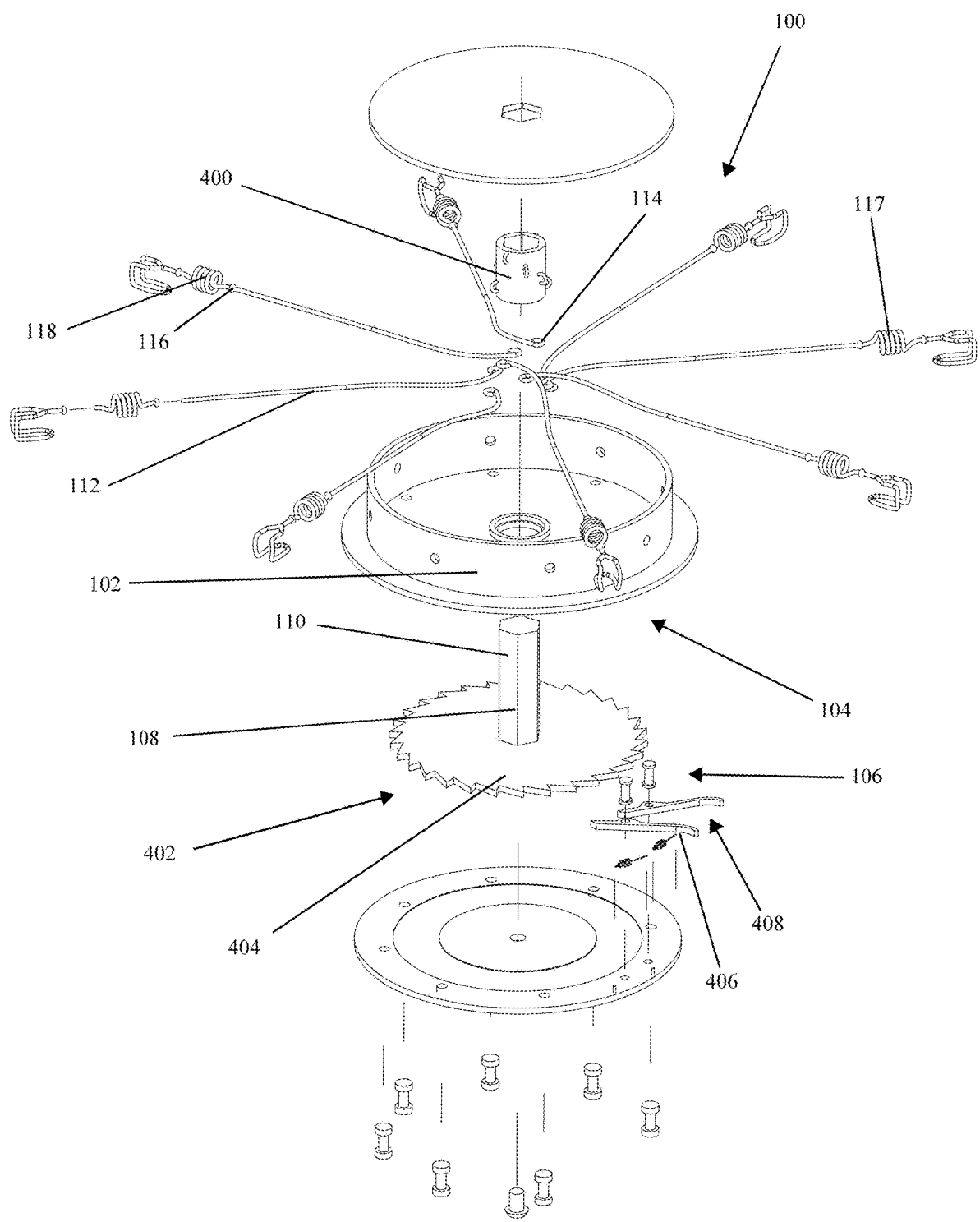
FIG. 4 depicts an exploded, perspective view of an automated tire tensioning device, in accordance with an embodiment of the invention.

FIG. 4 depicts an exploded, perspective view of an automated tire tensioning device, in accordance with an embodiment of the invention. In some embodiments, the device for the management of tire chain tension 100 may be comprised of a housing 102; a tension mechanism 104 contained in the housing 102 that is comprised of: a tension applicator 106, said tension applicator 106 having a plurality of settings wherein the plurality of settings are comprised of at least one engaged setting and a disengaged setting and each of the at least one engaged settings is configured to apply a different amount of tension; a tension shifter 108 configured to change the setting of the tension applicator 106 wherein the tension shifter 108 is at least partially contained in the housing 102 except for an external interaction flange 110 wherein the interaction flange 110 alters the setting of the tension applicator 106 when interacted with; one or more tension members 112 wherein the one or more tension members 112 are configured to apply a variable amount of tension to a tire chain based on the setting of the tension shifter 108, the one or more tension members 112 further being comprised of a first end 114 and a second end 116 and further comprised of, wherein the first end 114 is coupled to the tension applicator 106 and the second end 116 is comprised of a fastener 118 removably couplable to the tire chains.

The present invention may have embodiments wherein the device 100 is comprised of a central spool 400 comprised of a one-way ratcheting mechanism 402 comprised of a ratchet gear 404 configured to spin in a first direction and a second direction and a pawl 406 configured to permit the ratchet gear 404 to rotate in the first direction and to prevent the ratchet gear 404 from rotating in the second direction wherein the ratchet gear 404 is coupled to a central spool 400 where the central spool 400 is further coupled to a plurality of tension members 112 that extend out radially from the central spool 400 wherein each tension member 112 is comprised of a length of material, a first end 114, and a second end 116, wherein the second end 116 is comprised of a spring 117 followed by a fastener 118; and a tension release 408 coupled to the ratcheting mechanism 402 such that when actuated the tension release 408 will release the ratcheting 402 gear and allow it to spin in a second direction.

Figure 5:
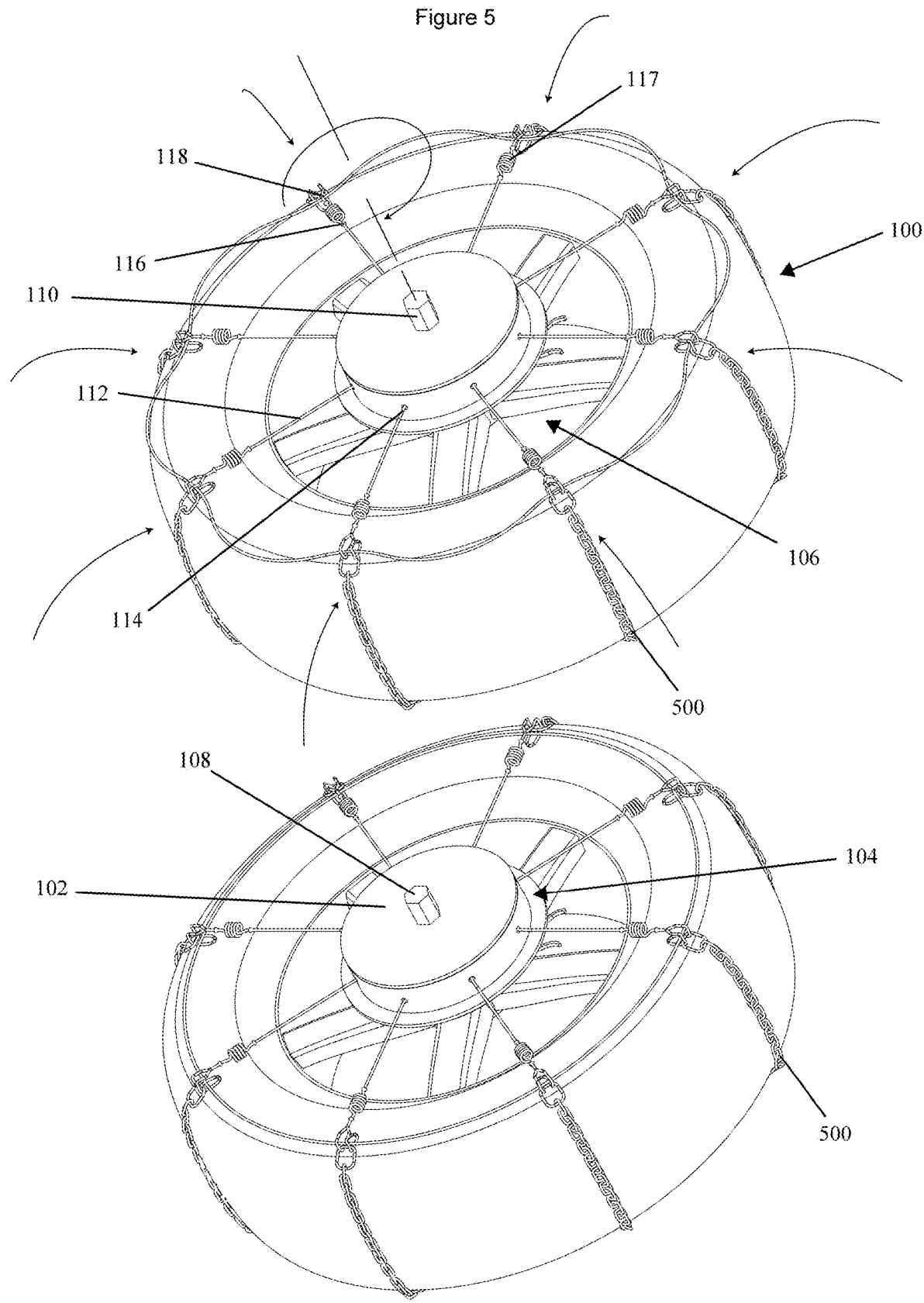
FIG. 5 depicts a perspective view of an automated tire tensioning device engaging with the chains of a tire, in accordance with an embodiment of the invention.

FIG. 5 depicts a perspective view of an automated tire tensioning device engaging with the chains of a tire, in accordance with an embodiment of the invention. In some embodiments of the invention, the device functions by operating a bolt, knob, or similar rotational engagement mechanism that is connected to an internal ratcheting mechanism and one or more spools of a length of material connected to the tension members 112. When the operating bolt is rotated, the internal spool is twisted, pulling on the tension members 112 and by design pulling the chain of a tire the tension members 112 are connected to inwards as well, thereby creating tension on the chains and pulling them against the tire. In some incarnations it can be desirable to tighten the chains taught against the tire, while in others it may be preferable to have them tighter but not necessarily maximally tight, and various embodiments of the invention may allow for variable tension settings. Once rotated, the ratcheting system ensures that the tension members 112 will not loosen and thus keep tension on the tire chains 500 during operation of the associated vehicle. In such embodiments, the device is additionally held in place on the vehicle by the same tire chains 500 it is aiding in maintaining tension. As shown, the device, in some embodiments is first applied to loosened tire chains 500, and then the tension shifter 108 is interacted with by a user, which causes the tension applicator 106 of the tension mechanism 104 to tighten and thereby pulling the tension members 112 towards the center of the device 100 and thereby tightening the tire chains 500.

Figure 6:
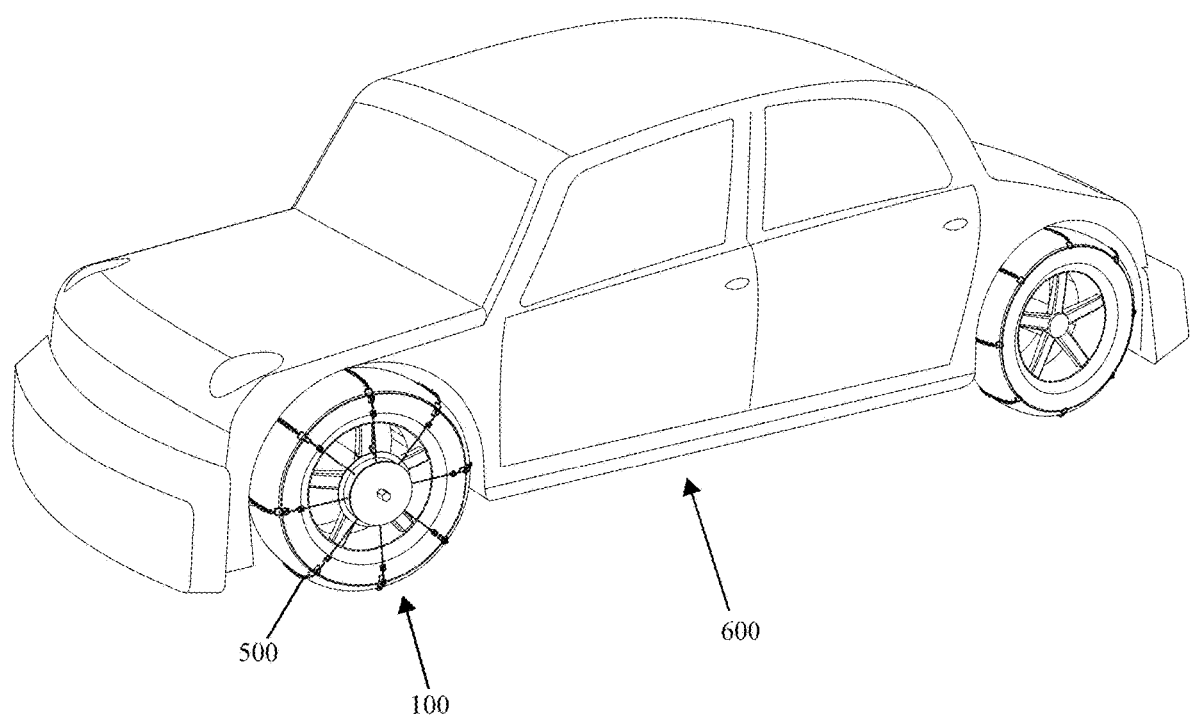
FIG. 6 depicts a perspective view of an automated tire tensioning device attached to an automobile, in accordance with an embodiment of the invention.

FIG. 6 depicts a perspective view of an automated tire tensioning device attached to an automobile, in accordance with an embodiment of the invention. In some embodiments, the device for the management of tire chain tension 100 may be comprised of a housing; a tension mechanism contained in the housing that is comprised of: a tension applicator, said tension applicator having a plurality of settings wherein the plurality of settings are comprised of at least one engaged setting and a disengaged setting and each of the at least one engaged settings is configured to apply a different amount of tension; a tension shifter configured to change the setting of the tension applicator wherein the tension shifter is at least partially contained in the housing except for an external interaction flange wherein the interaction flange alters the setting of the tension applicator when interacted with; one or more tension members wherein the one or more tension members are configured to apply a variable amount of tension to a tire chain 500 based on the setting of the tension shifter, the one or more tension members further being comprised of a first end and a second end and further comprised of, wherein the first end is coupled to the tension applicator and the second end is comprised of a fastener removably couplable to the tire chains 500. As demonstrated in FIG. 6, the invention may, in some embodiments, be utilized on an automobile 600.

Some embodiments of the device may be placed upon any variety of automobile 600 which relies upon tires and by extension tire chains 500 to improve traction during certain conditions, while other embodiments could be used on any other form of wheeled vehicle such as, but not limited to, agricultural machinery, construction machinery, logistics vehicles, or any similar vehicle. Other embodiments of the device may be implemented on crawler-treaded vehicles or vehicles with legs; any vehicle with friction-based locomotion could implement the present invention.

As described above, the present invention may be implemented in a variety of ways and on a variety of tension increasing devices, such as, but not limited to, tire chains. A similar mechanism could assist with crawler or track-based vehicles by helping prevent the wheel from separating from the track by applying a consistent pressure thereto. Similarly, the present invention could even be implemented on a foot-based locomotive device wherein the foot is being equipped with removable chains on its ground-contact side in order to increase traction; the present invention could be positioned on the foot and its tension members calibrated such that it would pull the chains back against the foot and thereby increase tension and traction. In effect, the present invention is not solely limited to wheeled vehicles.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

It should be understood that while certain preferred forms, embodiments, and examples of this invention have been illustrated and described, the present invention is not to be limited to the specific forms or arrangement of parts described and shown, and that the various features described may be combined in other ways than those specifically described without departing from the scope of the present invention.

What is claimed is:

1. A device for the management of a tire chain, the device comprising:
    a housing;
    a tension mechanism substantially contained in the housing and is comprised of:
        a ratcheting tension applicator, wherein the ratcheting tension applicator is comprised of a number of spools and the ratcheting tension applicator is configured with a plurality of settings wherein the plurality of settings are comprised of at least two engaged settings and a disengaged setting and each of the at least two engaged settings is configured to apply a different amount of tension, and the ratcheting tension applicator is at least partially contained in the housing except for an external interaction bolt wherein the interaction bolt turns the setting of the tension applicator when interacted with to the next higher engaged setting when rotated in a first direction and does nothing when rotated in a second direction, and the ratcheting tension applicator additionally is configured with a release which when activated sets the ratcheting tension applicator to the disengaged setting;
        a plurality of tension members wherein the plurality of tension members are comprised of a middle length, a first end, and a second end and further comprised of, wherein the first end is comprised of a spring that is coupled to one of the number of spools of the ratcheting tension applicator and the second end is comprised of a spring and a fastener removably couplable to the tire chains and wherein the tension mechanism is partially separable and is configured to be removably coupled from the tension members after switching to an engaged setting, leaving the tension members in place.

2. A device of increasing tension on a tire chain, the device comprising:
    a central spool comprised of a one-way ratcheting mechanism comprised of a ratchet gear configured to spin in a first direction and a second direction and a pawl configured to permit the ratchet gear to rotate in the first direction and to prevent the ratchet gear from rotating in the second direction wherein the ratchet gear is connected to a central spool where the central spool is further coupled to a plurality of tension members that extend out radially from the central spool wherein each tension member is comprised of a length of material, a first end, and a second end, wherein the second end is comprised of a spring followed by a fastener;
    a tension release coupled to the ratcheting mechanism such that when actuated the tension release will release the ratcheting gear and allow it to spin in a second direction,
    and wherein the tension mechanism is partially separable and is configured to be removably coupled from the tension members after switching to an engaged setting, leaving the tension members in place.

3. A device for the management of a tire chain, the device comprising:
    a housing;
    a tension mechanism comprised of:
        a tension applicator, said tension applicator having a plurality of settings wherein the plurality of settings is comprised of at least one engaged setting and a disengaged setting and each of the at least one engaged settings is configured to apply a different amount of tension;
        a tension shifter configured to change the setting of the tension applicator wherein the tension shifter is at least partially contained in the housing except for an external interaction flange wherein an operation bolt alters the setting of the tension applicator when interacted with;
        one or more tension members wherein the one or more tension members are configured to apply a variable amount of tension to a tire chain based on the setting of the tension shifter, the one or more tension members further being comprised of a first end and a second end and further comprised of, wherein the first end is coupled to the tension applicator and the second end is comprised of a fastener removably couplable to the tire chains;
        wherein the tension applicator and tension shifter components of the tension mechanism are contained within the housing and wherein the tension mechanism is partially separable and is configured to be removably coupled from the tension members after switching to an engaged setting, leaving the tension members in place while the tension shifter and tension applicator are removed.

4. The device of claim 3, wherein the device is further comprised of a quick release actuator wherein the quick release actuator is located on the housing and will cause the tension applicator to switch to the disengaged setting when the quick release actuator is activated.

5. The device of claim 3, wherein the tension mechanism is further configured with a quick release button wherein actuation of the quick release button will release the one or more tension members from the tension mechanism.

6. The device of claim 3, wherein the fastener of the tension member is a hook.

7. The device of claim 3, wherein the tension applicator is operated by an electronic control configured to cycle the device between the settings when operated by a user.

8. The device of claim 3, wherein the one or more tension shifters are further comprised of a ratchet system comprised of a gear with comprising a plurality of indentations where each of the indentations have a first side with a shallow slope and the indentations have a second side with a steep slope, and the pawl is positioned such that a point is facing in the steep slope such that the gear can freely rotate in the direction of the shallow slope but will be stopped if the gear tries to turn in the direction of the steep slope indentations.

9. The device of claim 8, wherein turning the gear of the ratchet system in the direction of the shallow slope indentations of the gear increases the tension on the tension members.

10. The device of claim 3, wherein the one or more tension members are further comprised of an intermediate length between the first end and second end and the intermediate length is comprised of a chain.

11. The device of claim 10, wherein the one or more tension members split into a plurality of ends at the second end and each of the plurality of ends is comprised of a fastener.

12. The device of claim 10, wherein the one or more tension members each is further comprised of a spring between the intermediate length and the fastener of the second end.

13. The device of claim 3 wherein the operation bolt is further comprised of a rod that when rotated in a first direction changes the tension applicator to its engaged setting and when rotated in a second direction has no effect.

14. The device of claim 13, wherein the device is further configured with an operation handle removably couplable to the operation bolt and configured to permit a user to turn the operation bolt in a desired direction.

15. The device of claim 13, wherein the tension applicator is further configured to stop increasing tension after the highest tension engaged setting is reached.

16. The device of claim 15, wherein the connections to the tire chains of the one or more tension applicator can be released simultaneously.

17. The device of claim 16, wherein the housing is further configured with a coupling mechanism configured to attach to a vehicle wheel.

18. The device of claim 17, where there are at least two tension members and the at least two tension members are arranged radially around the tension mechanism.

19. The device of claim 18, wherein the tension adjuster is comprised of a ratcheting mechanism wherein the at least one engaged settings correspond to the ratcheting mechanism being tightened and the disengaged setting corresponds to the ratchet being released and the ratcheting mechanism is operated through turning of the operation bolt.

* * * * *